(12) United States Patent
Lin

(10) Patent No.: US 12,085,541 B2
(45) Date of Patent: Sep. 10, 2024

(54) FALLING BALL INTERCEPTION DEVICE AND FALLING BALL IMPACT TESTER INCLUDING THE SAME

(71) Applicant: TRIPLE WIN TECHNOLOGY(SHENZHEN) CO. LTD., Shenzhen (CN)

(72) Inventor: Mao-Wei Lin, Shenzhen (CN)

(73) Assignee: TRIPLE WIN TECHNOLOGY(SHENZHEN) CO. LTD., Shenzhen (CN)

(*) Notice: Subject to any disclaimer, the term of this patent is extended or adjusted under 35 U.S.C. 154(b) by 119 days.

(21) Appl. No.: 17/835,881

(22) Filed: Jun. 8, 2022

(65) Prior Publication Data

US 2023/0049973 A1 Feb. 16, 2023

(30) Foreign Application Priority Data

Aug. 12, 2021 (CN) .......................... 202121906710.2

(51) Int. Cl.
*G01N 3/303* (2006.01)
*G01N 3/02* (2006.01)

(52) U.S. Cl.
CPC .............. *G01N 3/303* (2013.01); *G01N 3/02* (2013.01)

(58) Field of Classification Search
CPC ............ G01N 3/303; G01N 3/02; G01N 3/40; G01N 3/04; G01N 3/32; G01N 3/307; G01M 5/0066; G01G 17/00; G01L 5/0052; A63F 7/3622; A63B 69/40; A63B 53/04

See application file for complete search history.

(56) References Cited

U.S. PATENT DOCUMENTS

2013/0213113 A1* 8/2013 Huang ................. G01R 1/0458
73/12.13

FOREIGN PATENT DOCUMENTS

CN 113607368 A * 11/2021
JP 2010232020 A * 10/2010

* cited by examiner

*Primary Examiner* — Brandi N Hopkins
(74) *Attorney, Agent, or Firm* — ScienBiziP, P.C.

(57) ABSTRACT

A device to intercept a falling ball and prevent a second impact in a hardness or other test of a product and a falling ball impact tester including the device are disclosed. The device includes a sensor for detecting a position of the falling ball, an interception plate defining a catching groove, and a driving member connected to the interception plate and the sensor and providing motion. The driving member can move the interception plate to a position where the catching groove is in a falling path of the falling ball or is just outside such path, according to detection by the sensor.

18 Claims, 4 Drawing Sheets

FALLING BALL INTERCEPTION DEVICE AND FALLING BALL IMPACT TESTER INCLUDING THE SAME

FIELD

The subject matter herein generally relates to test devices, and more particularly to a device to intercept a falling ball in testing products and a falling ball impact tester including the device.

BACKGROUND

A falling ball impact test drops a ball (such as a steel ball) so that it falls freely from a certain height and impacts a product to be tested below, verifying the hardness, toughness, or durability of the product. For an ordinary falling ball impact tester, the ball will rebound and impact the product again after the first impact on the product, affecting the test results.

BRIEF DESCRIPTION OF THE DRAWINGS

Implementations of the present technology will now be described, by way of embodiment, with reference to the attached figures.

DETAILED DESCRIPTION

Figure 1:
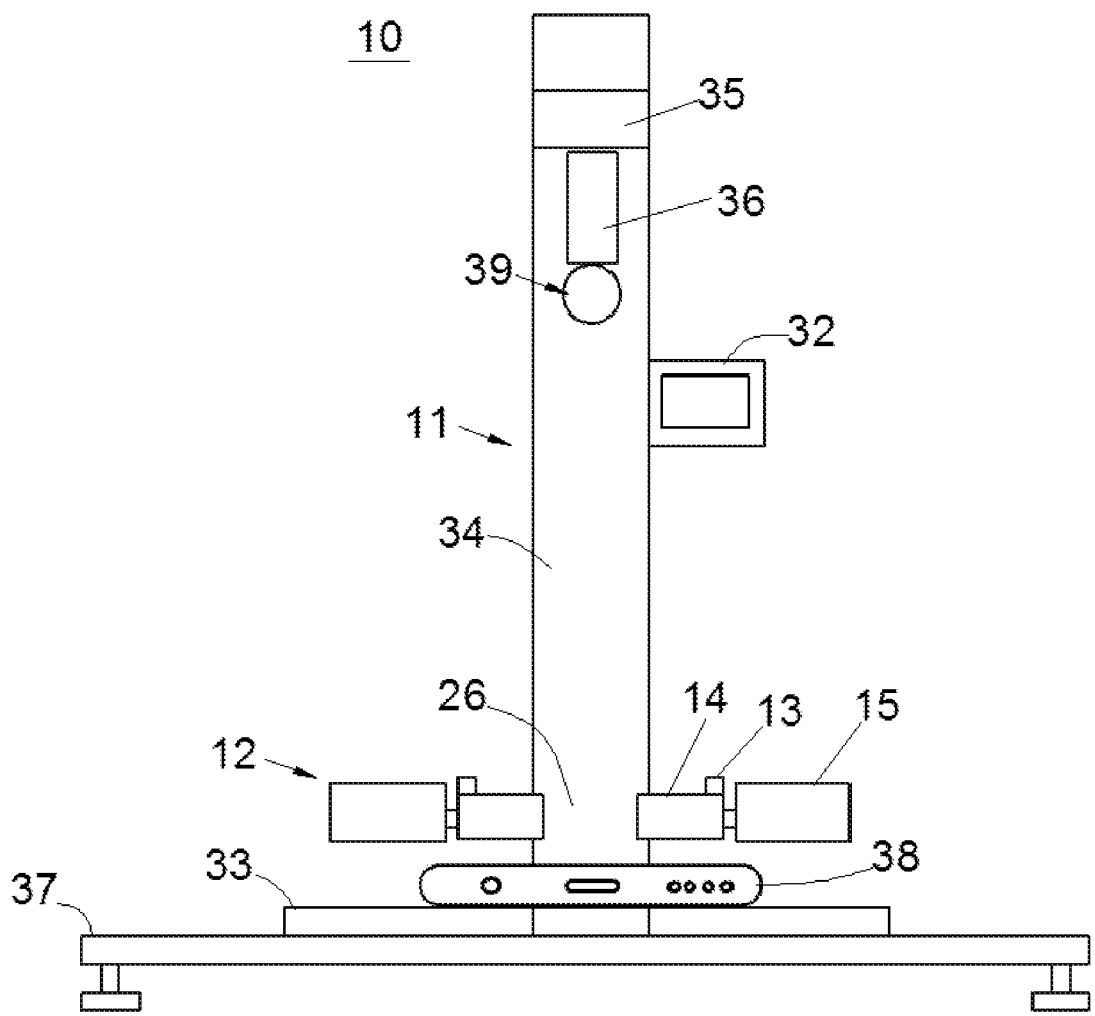
FIG. 1 is a front view of a falling ball impact tester with a falling ball on a holding member according to an embodiment of the present disclosure.

The present disclosure will now be described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure will be thorough and complete, and will fully convey the scope of the disclosure to those skilled in the art. Like reference numerals refer to like elements throughout.

The terminology used herein is for the purpose of describing particular exemplary embodiments only and is not intended to be limiting of the disclosure. As used herein, when a first component is referred to as "connecting" to a second component, it is intended that the first component may be directly connected to the second component or may be indirectly connected to the second component via a third component between them. When a first component is referred to as "disposed to" a second component, it is intended that the first component may be directly disposed to the second component or may be indirectly disposed to the second component via a third component between them.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The term "and/or" used herein includes any suitable combination of one or more related items listed.

Referring to FIG. 1, an embodiment of a falling ball impact tester 10 for a falling ball impact test is illustrated. The falling ball impact tester 10 includes a main body 11 and a falling ball interception device 12 to intercept a falling ball 39.

Figure 2:
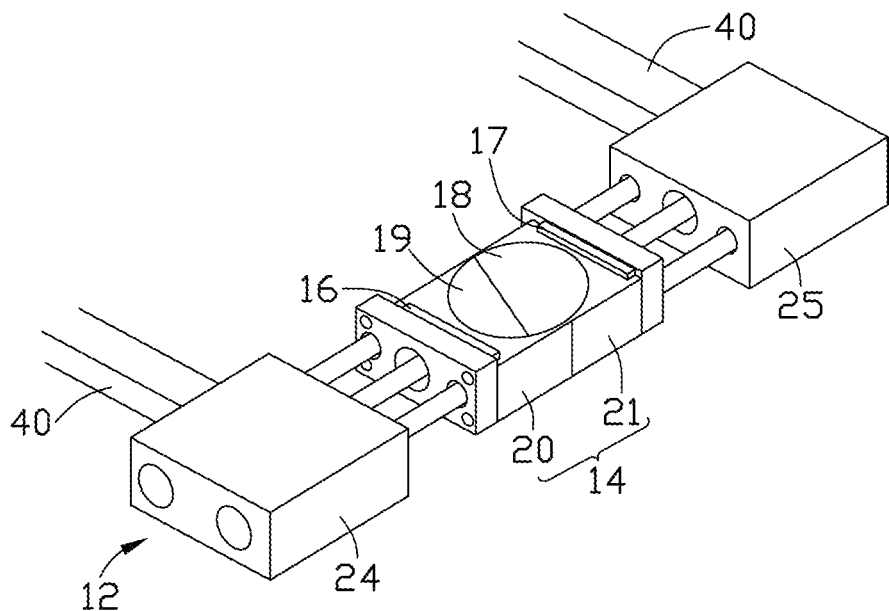
FIG. 2 is a perspective view of a falling ball interception device of the falling ball impact tester according to an embodiment of the present disclosure.
Figure 3:
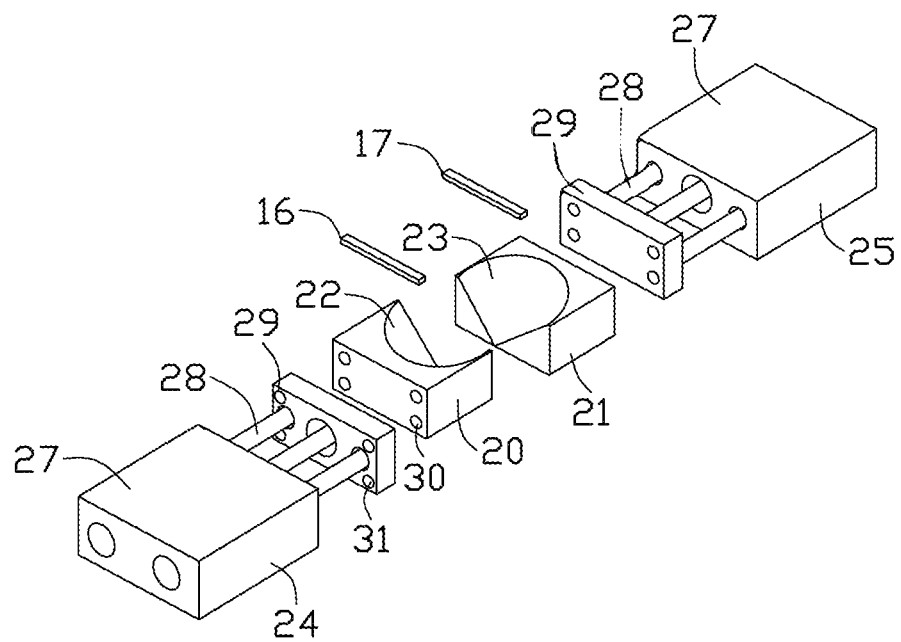
FIG. 3 is an exploded view of the falling ball interception device of FIG. 2.

Referring to FIGS. 1 to 3, the falling ball interception device 12 includes a sensor 13, an interception plate 14, and a driving member 15.

The sensor 13 is used to detect a position of the falling ball 39. The sensor 13 may be a light curtain sensor and includes a light emitting member 16 and a light receiving member 17 which are spaced apart from each other. A distance between the light emitting member 16 and the light receiving member 17 is greater than a diameter of the falling ball 39, allowing the falling ball 39 to pass through unimpeded. When the falling ball 39 passes through a space between the light emitting member 16 and the light receiving member 17, the light emitted by the light emitting member 16 is blocked by the falling ball 39, and the light receiving member 17 does not receive the light, a signal is thus generated to obtain the position of the falling ball 39. In other embodiments, the sensor 13 can sense the position of the falling ball 39 in other ways.

The interception plate 14 defines a catching groove 18 to catch and hold the falling ball 39. Alternatively, the catching groove 18 is conical. Since the catching groove 18 is conical, the falling ball 39 can be automatically positioned by the catching groove 18 when it falls into the catching groove 18. When the falling ball 39 falls into the catching groove 18 which is conical, vertical rebounds will not occur. The catching groove 18 may also be hemispherical, as long as the catching groove 18 can catch and hold the falling ball 39.

The falling ball interception device 12 is connected with the main body 11, and the interception plate 14 can be moved to a position where the catching groove 18 is in or away from a falling path of the falling ball 39.

In one alternative embodiment, a buffer 19 is disposed on a surface of the catching groove 18. The buffer 19 may completely cover the surface of the catching groove 18. The buffer 19 can buffer the falling ball 39 to reduce the impact of the falling ball 39 on the catching groove 18. The buffer 19 can also prevent the falling ball 39 from bouncing out of the catching groove 18 to ensure that the falling ball 39 stays in the catching groove 18. The buffer 19 may be a sponge or other impact-absorbing material.

Figure 4:
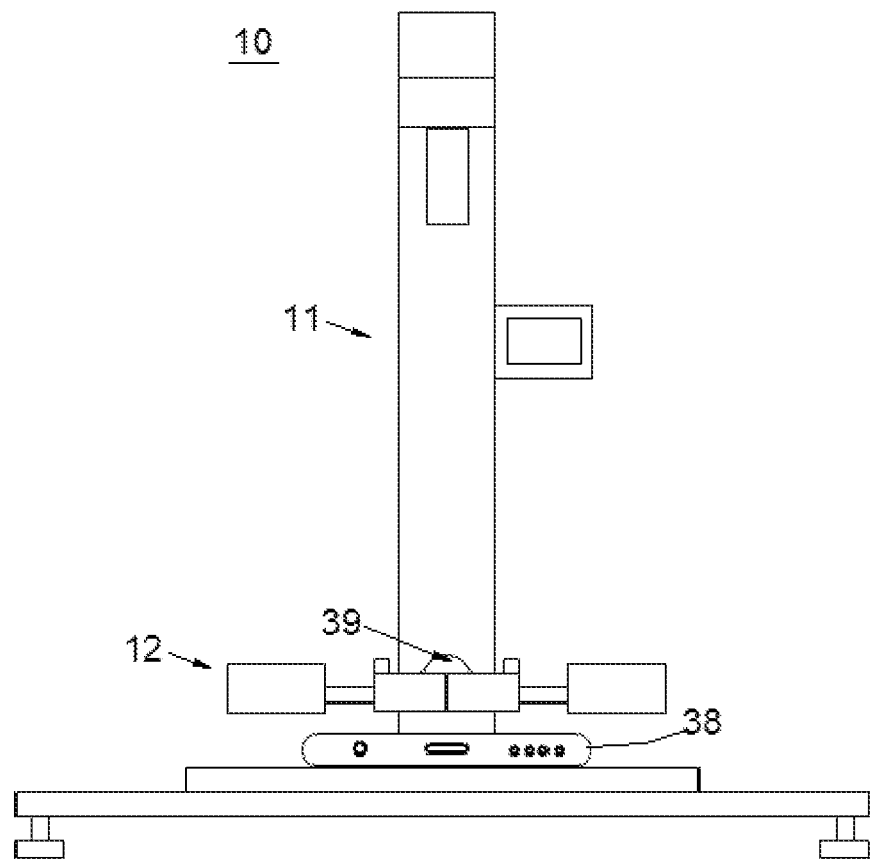
FIG. 4 is a front view of the falling ball impact tester with the falling ball in a catching groove according to an embodiment of the present disclosure.

The driving member 15 is connected with the interception plate 14. The driving member 15 is also electrically connected with the sensor 13. According to the position information, the driving member 15 can move the interception plate 14 into the falling path of the falling ball 39. Specifically, the interception plate 14 is moved to a position where a center of the catching groove 18 passes vertically through the ball center of the falling ball 39. FIG. 4 shows a state of the falling ball 39 when it falls into the catching groove 18.

The interception plate 14 includes a first plate portion 20 and a second plate portion 21. The first plate portion 20 defines a first groove portion 22. The second plate portion 21 defines a second groove portion 23. The first plate portion 20 and the second plate portion 21 can be made by forming a catching groove 18 (such as a conical groove) on an upper surface of a complete plate, and then cutting the complete plate into two halves along a dividing surface perpendicular to the plate, namely the first plate portion 20 and the second plate portion 21. When together, the first plate portion 20 and the second plate portion 21 form the catching groove 18. When the first plate portion 20 and the second plate portion 21 are separated from each other, a gap 26 between the first plate portion 20 and the second plate portion 21 allows the falling ball 39 to pass through unimpeded. The first plate portion 20 and the second plate portion 21 may also be formed separately.

In one embodiment, the light emitting member 16 and the light receiving member 17 are disposed on top surfaces of the first plate portion 20 and the second plate portion 21 respectively. With the movement of the first plate portion 20 and the second plate portion 21, the light emitting member 16 can move towards or away from the light receiving member 17.

In one embodiment, the interception plate 14 may be a complete plate with the catching groove 18, reducing a processing cost. When the interception plate 14 is integrally formed, the interception plate 14 must be able to move fast enough to catch or fast enough to avoid the falling ball 39. When the interception plate 14 is opened (i.e., the two halves are separated), the gap 26 is formed between the first plate portion 20 and the second plate portion 21, allowing the falling ball 39 to pass through, thus the opening and closing speed of the interception plate 14 can be reduced.

In one embodiment, the driving member 15 includes a first driving member 24 and a second driving member 25. The first driving member 24 is kinetically connected to the first plate portion 20. The second driving member 25 is kinetically connected with the second plate portion 21. The first driving member 24 and the second driving member 25 can drive the first plate portion 20 and the second plate portion 21 to move towards each other, so that the first groove portion 22 and the second groove portion 23 join together to form the catching groove 18. The first driving member 24 and the second driving member 25 can also drive the first plate portion 20 and the second plate portion 21 to move away from each other to form the gap 26 which allows the falling ball 39 to pass through. Alternatively, the first driving member 24 and the second driving member 25 are telescoping cylinders, which include a cylinder body 27 and a piston rod 28 connected with the cylinder body 27. An end of the piston rod 28 away from the cylinder body 27 is connected with a connecting plate 29. Each of the first plate portion 20 and the second plate portion 21 defines a threaded hole 30, the connecting plate 29 defines a connecting hole 31. In this way, a screw (not shown) can pass through the connecting hole 31 and can be threaded to the threaded hole 30, so that the first plate portion 20 is connected with the first driving member 24 and the second plate portion 21 is connected with the second driving member 25.

In other embodiments, the driving member 15 may be a cylinder powered electrically, which includes a rotating motor and a slidable table.

When the falling ball 39 bounces upward after impacting a product 38 to be tested, the driving member 15 drives the interception plate 14 to move according to the positioning information of the falling ball 39 detected by the sensor 13. The rebounded falling ball 39 is intercepted by the interception plate 14 and is caught by the catching groove 18, thereby preventing the falling ball 39 from impacting the product 38 a second time.

In one embodiment, the falling ball interception device 12 also includes a controller 32. The controller 32 is electrically connected with the sensor 13 and the driving member 15. The controller 32 can start counting time after the sensor 13 first senses the falling ball 39 and can control the driving member 15 to move the interception plate 14 into the falling path of the falling ball 39.

In one embodiment, the main body 11 includes a stage 33, a support 34, a sliding table 35, and a holding member 36.

The stage 33 supports the product 38. The stage 33 is substantially a flat plate, which can be horizontally arranged on a base 37 of an equipment. The stage 33 may be a flat and very stiff plate, such as a steel plate. During the test, the product 38 (such as mobile phone) is held on a top surface of the stage 33. Alternatively, a fixture (not shown) may also be set to clamp and position the product 38.

The support 34 is arranged vertically. The support 34 can be fixedly connected with a bottom end of the base 37. The sliding table 35 is slidably connected with the support 34 and can rise and fall vertically. Alternatively, a sliding track (not shown) extending vertically is arranged on one side of the support 34, and the sliding table 35 is fixed on the sliding track to realize a vertical sliding relative to the support 34.

The holding member 36 is connected with the sliding table 35 and is located above the catching groove 18. The holding member 36 can move with the sliding table 35 to collect the falling ball 39 after being caught by the catching groove 18. The holding member 36 can be an electromagnet or a vacuum device, and the falling ball 39 is a steel ball. When in use, the falling ball 39 is held on the holding member 36 and is lifted to a predetermined height, the falling ball 39 falls to impact the product 38 when the electromagnet is powered off or the vacuum is released. The falling ball 39 may then rebound above the falling ball interception device 12 and fall again, being caught by the catching groove 18 of the interception plate 14.

In one embodiment, the falling ball interception device 12 may be movably connected with the support 34. The distance between the falling ball interception device 12 and the support 34 may be adjusted in height, to adapt to different falling balls 39. In one embodiment, each of the first driving member 24 and the second driving member 25 is connected with the support 34 through a connecting frame 40. The falling ball interception device 12 may be connected with the support 34 through a screw.

Figure 5:
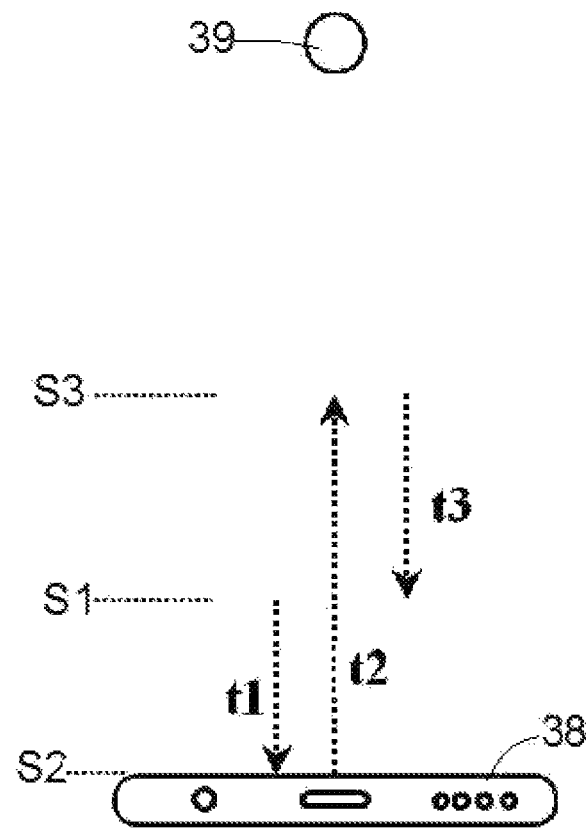
FIG. 5 is a schematic diagram showing time of different stages of the falling ball when in motion in a test process.

Referring to FIG. 5, the falling ball impact test may, for example, be carried out on a screen of a mobile phone (i.e., the product 38) to test the impact resistance of the screen.

In experimentation, a steel ball (i.e., the falling ball 39) with a mass of 135g and a diameter of 3 cm fell onto the screen from a height of 30 cm from the screen surface; the steel ball rebounded, then the interception plate 14 was moved to a catching position by the driving member 15, the steel ball falling into the catching groove 18.

When the sensor 13 detects the first dropping of the steel ball, the driving member 15 drives the interception plate 14 to move. In FIG. 5, t1 is the time taken for the steel ball to fall from the sensor (position S1) to the screen (position S2) during the first falling process of the steel ball. t2 is the time taken for the steel ball to rebound from the screen (position S2) to a highest point S3, and t3 is the time taken for the steel ball to fall from the highest point S3 to the sensor (position S1). It was calculated that t1=0.022 s, t2=0.157 s, t3=0.120 s.

The difference in time between the two droppings of the steel ball to the sensor 13 is t, t=t1+t2+t3=0.279 s. The first plate portion 20 and the second plate portion 21 are separated by 4 cm, the steel ball can be reliably intercepted as long as the closing time of the first plate portion 20 and the second plate portion 21 is less than 0.279 seconds. For example, the closing time may be set to 0.1 seconds.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A falling ball interception device, the device comprising:
    a sensor for detecting a position of the falling ball;
    an interception plate defining a catching groove configured to catch and hold the falling ball; and
    a driving member kinetically connected to the interception plate and electrically connected with the sensor, wherein the driving member is configured to move the interception plate to a position where the catching groove is in or away from a falling path of the falling ball according to detection by the sensor.

2. The falling ball interception device of claim 1, wherein the catching groove is conical.

3. The falling ball interception device of claim 1, further comprising a buffer disposed on a surface of the catching groove.

4. The falling ball interception device of claim 3, wherein the buffer is a sponge.

5. The falling ball interception device of claim 1, wherein the interception plate comprises a first plate portion defining a first groove portion and a second plate portion defining a second groove portion, the driving member comprises a first driving member kinetically connected to the first plate portion and a second driving member kinetically connected to the second plate portion; when the first driving member and the second driving member drive the first plate portion and the second plate portion to move towards each other, the first groove portion and the second groove portion are adapted to joint together to form the catching groove; when the first driving member and the second driving member drive the first plate portion and the second plate portion to move away each other, the first plate portion is adapted to be separated from the second plate portion to form a gap for the falling ball to pass through unimpeded.

6. The falling ball interception device of claim 5, wherein each of the first driving member and the second driving member comprises a cylinder body, a piston rod connected with the cylinder body, and a connecting plate connected with an end of the piston rod away from the cylinder body.

7. The falling ball interception device of claim 6, wherein the sensor comprises a light emitting member disposed on the first plate portion and a light receiving member disposed on the second plate portion.

8. The falling ball interception device of claim 1, further comprising a controller electrically connected with the driving member, wherein the controller is configured to control the driving member to move the interception plate to the position where the catching groove is in the falling path of the falling ball.

9. A falling ball impact tester comprising:
    a main body; and
    a falling ball interception device to intercept a falling ball, the device being connected with the main body and comprising:
        a sensor for detecting a position of the falling ball;
        an interception plate defining a catching groove configured to catch and hold the falling ball; and
        a driving member kinetically connected to the interception plate and electrically connected with the sensor, wherein the driving member is configured to move the interception plate to a position where the catching groove is in or away from a falling path of the falling ball according to detection by the sensor;
        wherein the interception plate comprises a first plate portion defining a first groove portion and a second plate portion defining a second groove portion, the driving member comprises a first driving member kinetically connected to the first plate portion and a second driving member kinetically connected to the second plate portion; when the first driving member and the second driving member drive the first plate portion and the second plate portion to move towards each other, the first groove portion and the second groove portion are adapted to joint together to form the catching groove; when the first driving member and the second driving member drive the first plate portion and the second plate portion to move away each other, the first plate portion is adapted to be separated from the second plate portion to form a gap for the falling ball to pass through unimpeded.

10. The falling ball impact tester of claim 9, wherein the main body comprises:
    a stage for carrying a product to be tested;
    a support arranged vertically relative to the stage;
    a sliding table slidably connected with the support; and
    a holding member connected with the sliding table and located above the catching groove;
    wherein the holding member is capable of moving with the sliding table to pick up the falling ball falling into the catching groove.

11. The falling ball impact tester of claim 10, wherein the holding member is an electromagnet.

12. The falling ball impact tester of claim 10, wherein the device is movably connected with the support.

13. The falling ball impact tester of claim 9, wherein the catching groove is conical.

14. The falling ball impact tester of claim 9, wherein the device further comprises a buffer disposed on a surface of the catching groove.

15. The falling ball impact tester of claim 14, wherein the buffer is a sponge.

16. The falling ball impact tester of claim 9, wherein the falling ball interception device further comprises a controller electrically connected with the driving member, the controller is configured to control the driving member to move the interception plate to the position where the catching groove is in the falling path of the falling ball.

17. The falling ball impact tester of claim 9, wherein each of the first driving member and the second driving member comprises a cylinder body, a piston rod connected with the cylinder body, and a connecting plate connected with an end of the piston rod away from the cylinder body.

18. The falling ball impact tester of claim 17, wherein the sensor comprises a light emitting member disposed on the first plate portion and a light receiving member disposed on the second plate portion.

* * * * *